US009502906B2

(12) United States Patent
Hashimoto et al.

(10) Patent No.: US 9,502,906 B2
(45) Date of Patent: Nov. 22, 2016

(54) RELAY UNIT AND PRODUCING METHOD THEREOF

(71) Applicant: OMRON CORPORATION, Kyoto-shi, Kyoto (JP)

(72) Inventors: Ryuichi Hashimoto, Yamaga (JP); Keisuke Yano, Kikuchi (JP)

(73) Assignee: OMRON Corporation, Kyoto (JP)

( * ) Notice: Subject to any disclaimer, the term of this patent is extended or adjusted under 35 U.S.C. 154(b) by 552 days.

(21) Appl. No.: 13/869,908

(22) Filed: Apr. 24, 2013

(65) Prior Publication Data

US 2013/0313915 A1    Nov. 28, 2013

(30) Foreign Application Priority Data

May 15, 2012    (JP) .................................. 2012-111596

(51) Int. Cl.
| | |
|---|---|
| H02B 1/24 | (2006.01) |
| H01H 47/00 | (2006.01) |
| H01R 13/66 | (2006.01) |
| H02J 4/00 | (2006.01) |
| B60L 11/18 | (2006.01) |
| H01H 50/02 | (2006.01) |
| H01H 11/00 | (2006.01) |
| H01H 50/04 | (2006.01) |

(52) U.S. Cl.
CPC ................. *H02J 4/00* (2013.01); *B60L 11/18* (2013.01); *H01H 11/00* (2013.01); *H01H 50/021* (2013.01); *H01H 2050/049* (2013.01); *Y10T 29/49169* (2015.01); *Y10T 307/76* (2015.04)

(58) Field of Classification Search
USPC ........................ 307/115; 439/620.24, 620.25
See application file for complete search history.

(56) References Cited

U.S. PATENT DOCUMENTS

| | | | | |
|---|---|---|---|---|
| 6,062,916 | A | * | 5/2000 | Gladd .................... H01R 9/091 439/751 |
| 2005/0253460 | A1 | | 11/2005 | Nakanishi et al. |
| 2007/0108939 | A1 | | 5/2007 | Miyagi et al. |
| 2011/0187127 | A1 | | 8/2011 | Murata et al. |

FOREIGN PATENT DOCUMENTS

| | | |
|---|---|---|
| JP | 2001-237558 A | 8/2001 |
| JP | 2001-359283 | 12/2001 |
| JP | 2008-270121 | 11/2008 |
| JP | 2009-193721 | 8/2009 |
| JP | 2011-163122 | 8/2011 |

OTHER PUBLICATIONS

English Translation of Korean Office Action, Mailed on Mar. 23, 2014, Regarding Application No. 10-2013-0017385, 8pp.
Notification of Reasons for Refusal for corresponding Japanese Patent Application No. 2012-111596, issued Jan. 25, 2016 (Japanese language and English-language translation.).

* cited by examiner

*Primary Examiner* — Rexford Barnie
*Assistant Examiner* — Dru Parries
(74) *Attorney, Agent, or Firm* — Klarquist Sparkman, LLP

(57) ABSTRACT

A relay unit electrically opens and closes between a power supply and a power-consuming device. The relay unit includes electronic components in a housing including a case and a cover, the electronic components including a resistor, a first relay connected in series with the resistor, and a second relay, the second relay connecting the power supply and the power-consuming device through an external connection terminal and being connected in parallel with the resistor and the first relay.

19 Claims, 20 Drawing Sheets

RELAY UNIT AND PRODUCING METHOD THEREOF

CROSS REFERENCE TO RELATED APPLICATION

This application claims the benefit of priority from Japanese Patent Application No. 2012-111596, filed on May 15, 2012, the entire contents of which is incorporated herein by reference.

BACKGROUND

The present invention relates to a relay unit, for example, to an in-vehicle relay unit in which a plurality of relays are assembled in a housing.

Conventionally, for example, Japanese Unexamined Patent Publication No. 2001-237558 discloses a power-circuit breaking relay unit. In the power-circuit breaking relay unit, a plurality of accommodation parts are formed in a case having an open upper surface and in each of the accommodation parts a relay is independently accommodated, a cover is provided in order to close the open upper-surface part of the case, an opening is formed in an upper-surface open edge of the case and/or the cover such that a connection member connected to a connection terminal of each relay is projected, the open part of the case is closed by the cover while the connection member connected to the connection terminal of the relay is projected from each opening, and an attachment part attached to a fixed part is formed in an outside surface of the case.

However, in the power-circuit breaking relay unit where the power-circuit breaking relay unit is connected to an external circuit, it is necessary to separately prepare and electrically connect the resistor. Therefore, there is a problem that connection work becomes troublesome to degrade workability. The present invention has been devised to solve the problems described above, and an object thereof is to provide a relay unit in which the electric connection work is simplified.

SUMMARY OF INVENTION

In accordance with one aspect of the present invention, a relay unit electrically opens and closes between a power supply and a power-consuming device, the relay unit includes electronic components which are accommodated in a housing and the housing includes a case and a cover. The electronic components include a resistor, a first relay connected in series with the resistor, and a second relay. The second relay connects the power supply and the power-consuming device through an external connection terminal and connects in parallel with the resistor and the first relay.

In one aspect of the present invention, the electronic components are accommodated in the same housing and the second relay is connected in parallel with the first relay and the first relay is connected in series with the resistor. Unlike the conventional example, it is not necessary to separately prepare and electrically connect the resistor. Therefore, the connection work is simplified to obtain the high-workability relay unit.

In the relay unit, preferably connection terminals of the resistor and connection terminals of the first relay are projected toward an opening of the case, one of the connection terminals of the resistor and one of the connection terminals of the first relay are electrically connected to each other, the other connection terminal of the resistor and one of external connection terminals of the second relay are electrically connected to each other, and the other connection terminal of the first relay and the other external connection terminal of the second relay are electrically connected to each other. Accordingly, the relay unit including the precharge circuit is obtained.

In the relay unit, preferably the second relay is accommodated in the housing such that a winding shaft center of a coil is disposed along the opening of the case. Accordingly, the low-profile relay unit is obtained.

In the relay unit, preferably a connecting projection piece is projected toward the opening of the case, the connecting projection piece being projected from the external connection terminal of the second relay. Accordingly, the high-productivity relay unit is obtained because the electric connection is facilitated.

In yet another preferred embodiment of the present invention, electronic components are accommodated in the housing, the electronic components including the resistor, the first relay, the second relay, and a third relay, the third relay electrically connecting the power supply and the power-consuming device through the external connection terminal. Accordingly, the relay unit having the higher safety and reliability is obtained.

In the relay unit, preferably the second relay and the third relay are accommodated in the housing such that the winding shaft centers of the coils are provided along the opening of the case and in parallel with each other. Accordingly, the low-profile relay unit is obtained.

In the relay unit, preferably the external connection terminals of the second and third relays are laterally projected from outside surfaces opposed to each other in the case. Even if a large inertia force acts on the second and third relays from the same direction because an impact force is externally applied, at least one of the second and third relays surely breaks the circuit. Therefore, the high-safety relay unit is obtained.

In the relay unit, preferably each electronic component is accommodated in each of accommodation parts partitioned by an insulating wall provided in the case. Accordingly, the relay unit having the excellent insulating characteristic is obtained because each electronic component is accommodated in the accommodation part partitioned by the insulating wall.

In the relay unit, preferably a control circuit block controlling the relay and each of the electronic components are accommodated in the housing. Accordingly, the work to separately prepare and electrically connect the control circuit block is eliminated, and the work to connect the relay unit to the external circuit is further facilitated to obtain the high-workability relay unit.

In the relay unit, preferably the resistor is accommodated in a recess in an exchangeable manner, the recess being provided in an outer surface of the case. Because the resistor can externally be exchanged, maintenance is easily performed, and the relay unit having a different specification is obtained. Therefore, the relay unit in which inventory adjustment is facilitated is obtained.

In the relay unit, preferably an insulating wall is provided between the external connection terminals. Accordingly, the relay unit having the excellent insulating characteristic is obtained.

In the relay unit according, preferably one of the connection terminals of the resistor and one of the connection terminals of the first relay are connected to each other through a connecting projection piece vertically provided in a wiring board while insulated from a relay driving coil terminal of the relay, and the other connection terminals of the first relay and one of the external connection terminals of the second relay are connected to each other through the connecting projection piece vertically provided in the wiring board while insulated from the relay driving coil terminal of the relay, and the other connection terminal of the resistor and the other external connection terminal of the second relay are directly electrically connected to each other. Accordingly, the relay unit in which the electric connection of the secondary-side wiring connecting the power supply and the power-consuming device is facilitated while the insulation is established from the secondary-side wiring electrically connecting the coil terminal of the relay is obtained.

In the relay unit, preferably the coil terminal is projected toward the opening of the case, and the coil terminal is electrically connected through the wiring board accommodated in the housing. Accordingly, the relay unit in which the electric connection of the coil terminal through the wiring board is further facilitated is obtained.

In the relay unit, preferably a guide projected thread is projected on the wiring board in order to guide a wiring for electrically connecting the coil terminal. Accordingly, the wiring can be provided along the guide projected thread, the workability is improved, positioning accuracy is improved, and the relay unit having the high insulating characteristic is obtained.

In the relay unit, preferably the connecting projection piece is vertically provided on the wiring board. Accordingly, the relay unit in which the electric connection of the coil terminal is further facilitated is obtained.

In accordance with another aspect of the present invention, a method for producing the relay unit of the present invention in which, after each electronic component of the relay unit is accommodated from an opening of a case, a coil terminal projected toward the opening of the case from the electronic component is electrically connected through a wiring board.

In another aspect of the present invention, the first relay connected in series with the resistor is connected in parallel with the second relay, and the first relay and the second relay are accommodated in the same housing. Unlike the conventional example, it is not necessary to separately prepare and electrically connect the resistor. Therefore, advantageously the connection work is simplified to obtain the high-workability relay unit.

DETAILED DESCRIPTION

Figure 1A:
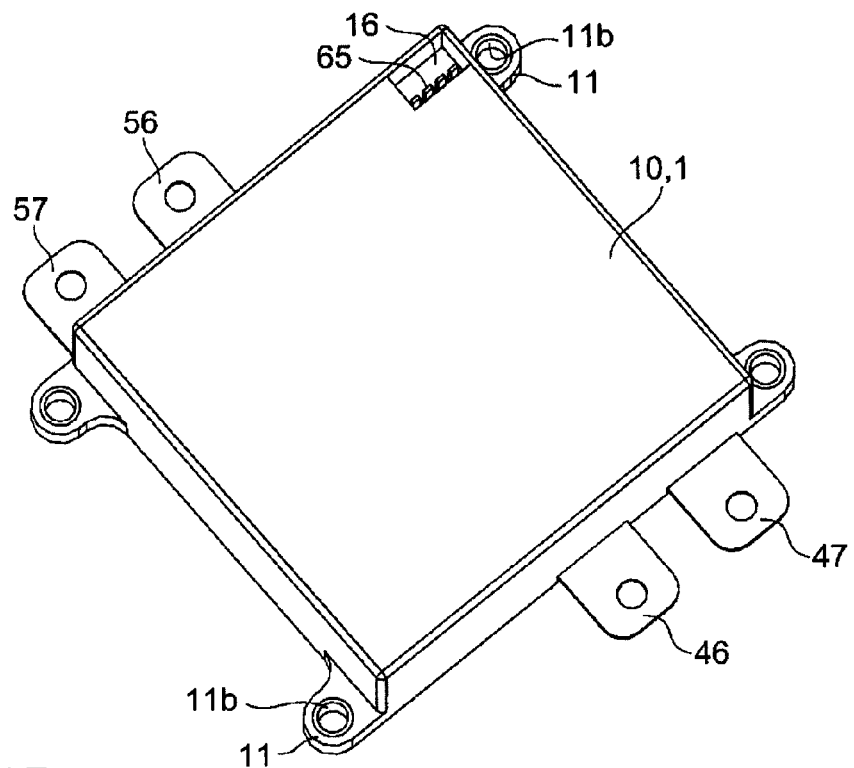
FIGS. 1A and 1B are perspective views illustrating a relay unit according to a first embodiment of the present invention.
Figure 1B:
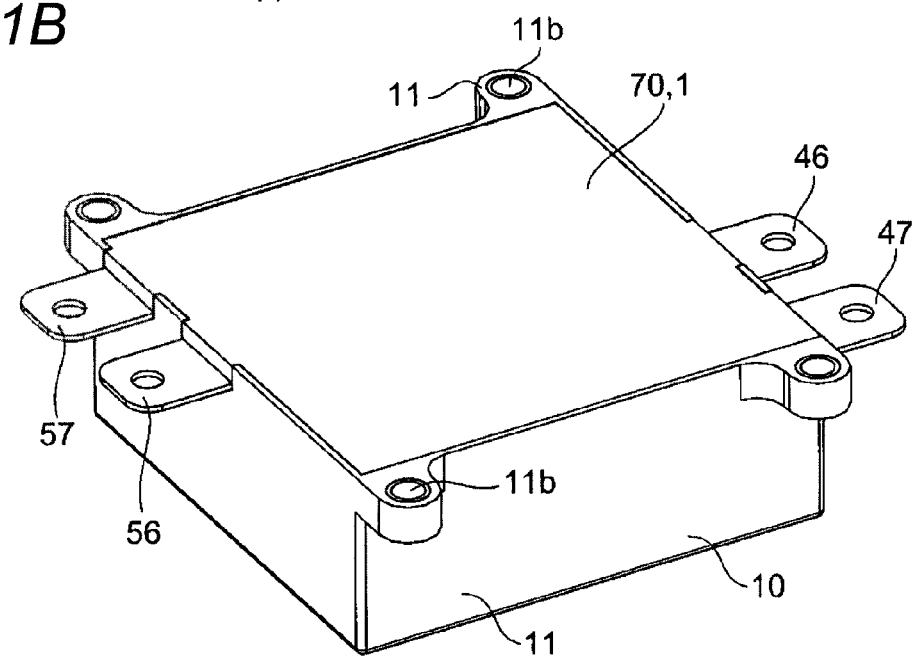

A relay unit according to an exemplary embodiment of the present invention will be described with reference to FIGS. 1 to 20. As illustrated in FIGS. 1 to 4, in a relay unit 1 according to a first embodiment, a precharge resistor 20, a precharge relay 30 that is of a first relay, a second relay 40, and a third relay 50 are assembled in a housing that includes a case 10 and a cover 70, and these electronic components are electrically connected to one another through a wiring board 60. As illustrated in FIG. 4B, an electric connection between a battery 3 and an automobile motor 4 through an inverter 2 can be cited as an example of an application of the relay unit 1 of the first embodiment.

Figure 2:
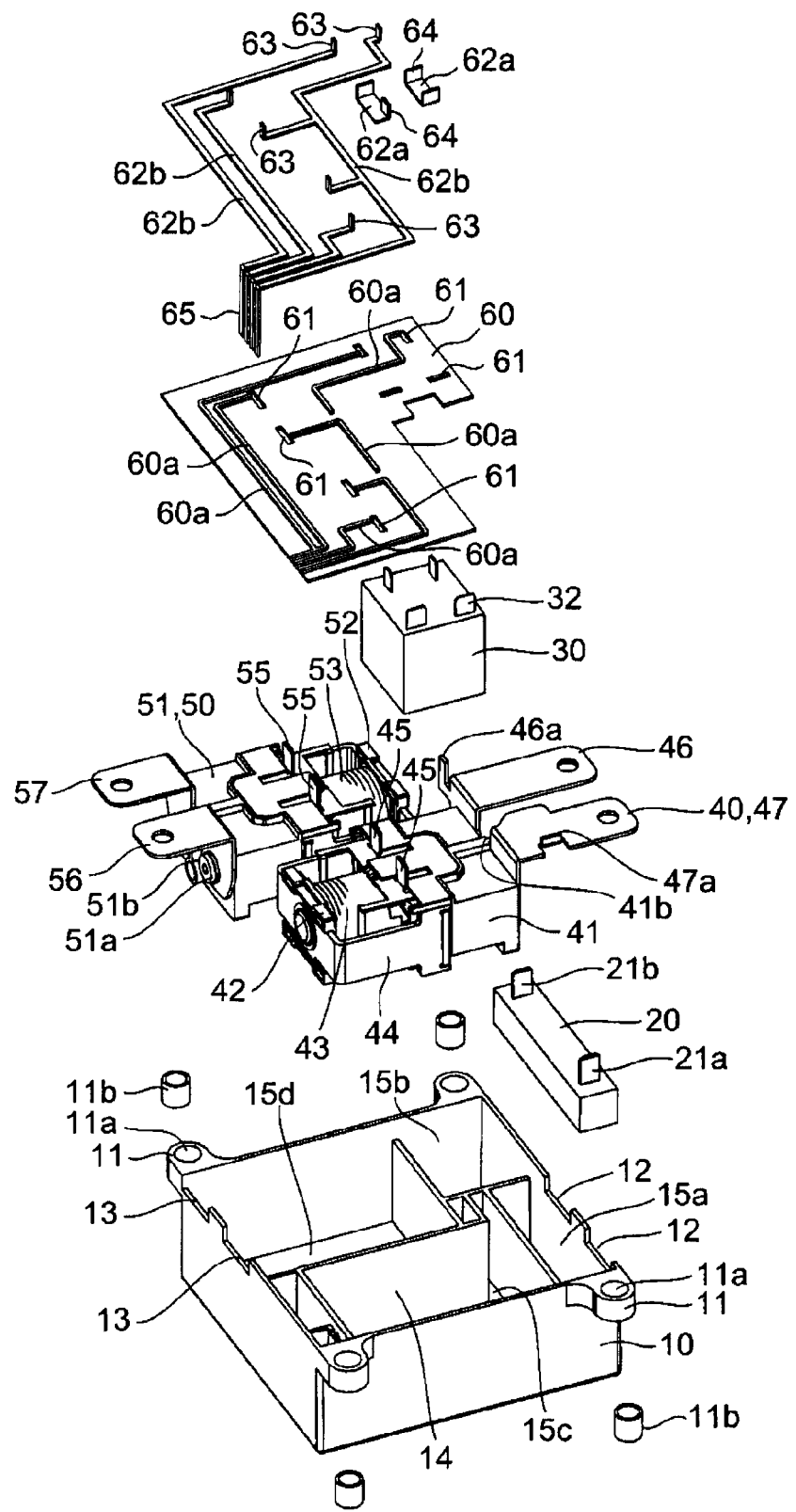
FIG. 2 is an exploded perspective view of the relay unit in FIG. 1B.
Figure 3:
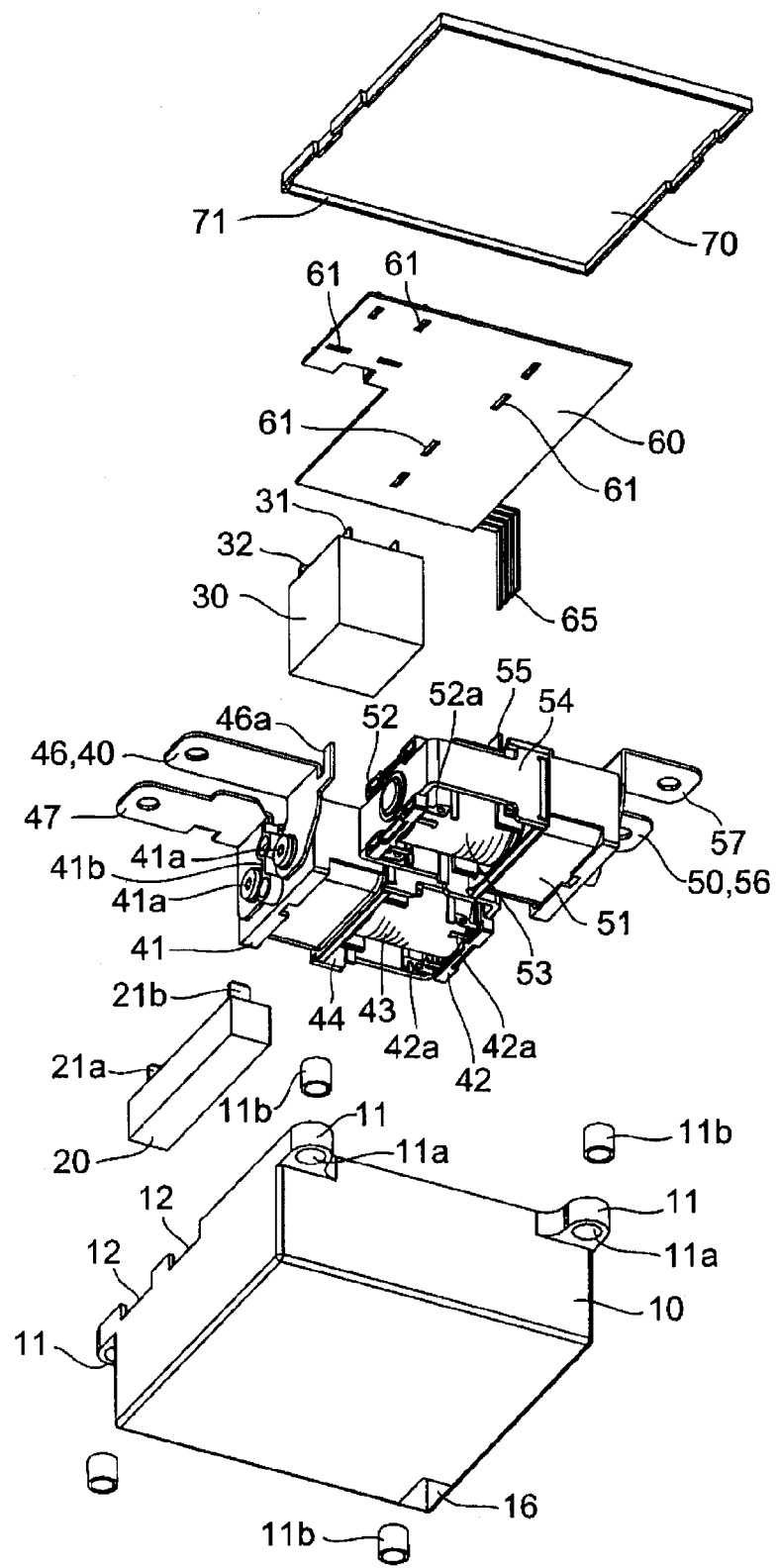
FIG. 3 is an exploded perspective view illustrating the relay unit in FIG. 1B from a different angle.
Figure 4A:
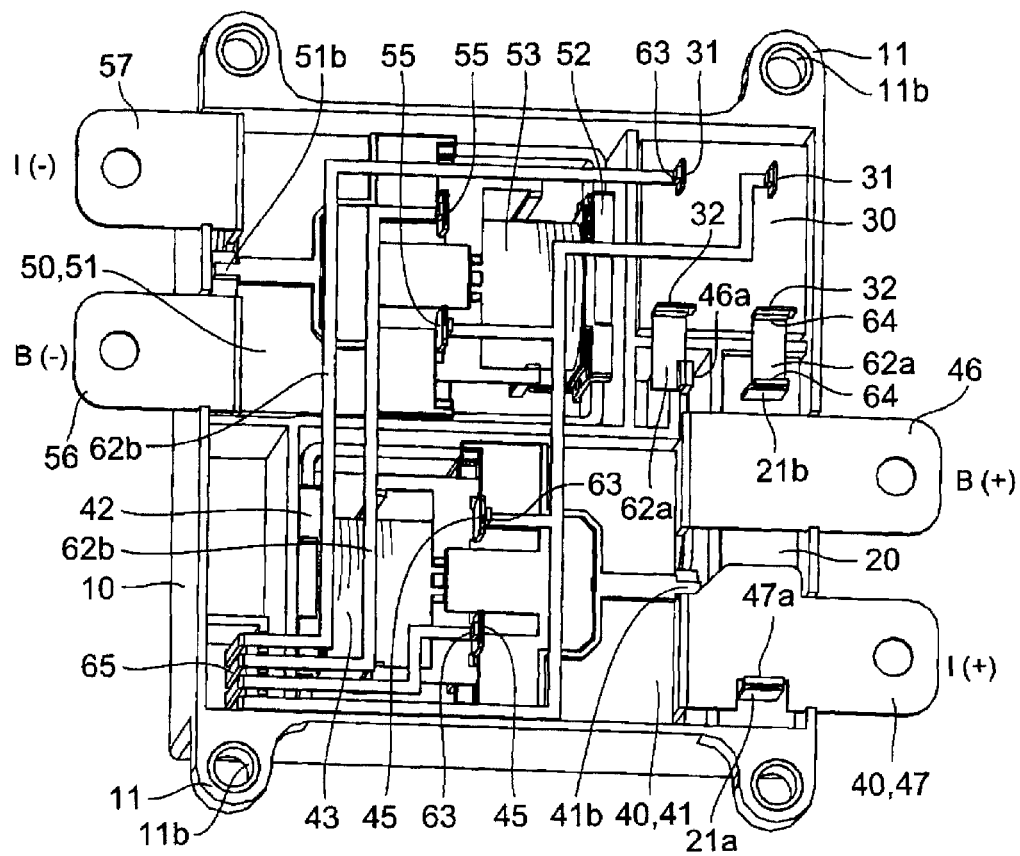
FIGS. 4A and 4B are a perspective view and a circuit diagram illustrating a state in which a cover is removed from the relay unit in FIG. 1B.
Figure 4B:
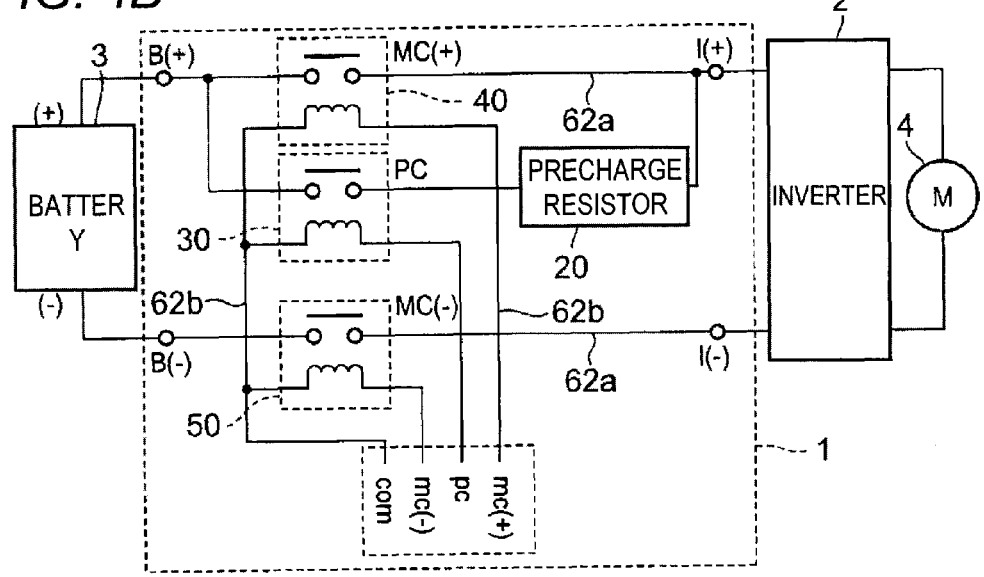

For the sake of convenience, the cover 70 is not illustrated in FIG. 2, and the wiring board 60 is not illustrated in FIG. 4 while a secondary-side wiring 62a that connects the battery 3 and the motor 4 and a primary-side wiring 62b, which is connected to coils of the precharge relay 30 that is of the first relay, the second relay 40, and the third relay 50, are illustrated in FIG. 4.

The case 10 is formed into a box shape that has an opening in a bottom surface. In the case 10, fixing ribs 11 are laterally projected from an opening edge portion of each of side surfaces opposed to each other, and a pair of terminal notch parts 12 and a pair of terminal notch parts 13 are provided in opening edge portions of each of remaining side surfaces opposed to each other. A reinforcing cylindrical fitting 11b is integrally molded in a fixed hole 11a of the fixing rib 11. In the case 10, accommodation parts 15a, 15b, 15c, and 15d in which such electronic components as the precharge resistor 20 are accommodated are partitioned by a partition wall 14 that is projected from the bottom surface of the case 10 so as to become the same height as the case 10. Therefore, the wiring board 60 can be placed and positioned on the partition wall 14 without rattle. A height adjusting rib (not illustrated) is also provided in the accommodation part 15a in order to adjust the positioning height of the precharge resistor 20. A connecting recessed part 16 (FIG. 3) that is communicated with an internal space is provided in a corner portion of a ceiling surface of the case 10.

The precharge resistor 20 has a solid shape that can be fitted in the accommodation part 15a of the case 10, and connection terminals 21a and 21b are projected from an upper surface of the precharge resistor 20. The precharge resistor 20 is connected in series with the precharge relay 30 through the wiring board 60, as will be described below.

The precharge relay 30 that is of the first relay has the solid shape that can be accommodated in the accommodation part 15b of the case 10, and a coil terminal 31 and a connection terminal 32 are projected from the upper surface of the precharge relay 30.

As illustrated in FIG. 2, the second relay 40 has the solid shape that can be accommodated in the accommodation part 15c of the case 10, a coil 43 is wound around a spool 42 assembled in a relay body 41, and a yoke 44 having a substantial U-shape in section is assembled in the second relay 40. The coil 43 is connected to a coil terminal 45 through a junction terminal 42a (FIG. 3) assembled in the spool 42, and the coil terminal 45 is projected toward the opening of the case 10. L-shaped rib terminals 46 and 47 that can be fitted in the notch parts 12 of the case 10 are attached to terminal parts 41a (FIG. 3) of the relay body 41. Connecting projection pieces 46a and 47a are cut and raised in base portions of the rib terminals 46 and 47, respectively. An insulating rib 41b (FIG. 3) is projected between the terminal parts 41a and 41a of the relay body 41 in order to enhance an insulating characteristic. A lower end surface of the relay body 41, the lower end surface of the spool 42, and a lower end surface of the yoke 44 are formed so as to be flush with one another, so that the second relay 40 can be accommodated in the case 10 without rattle.

As illustrated in FIG. 2, the third relay 50 has the solid shape that can be accommodated in the accommodation part 15d of the case 10, a coil 53 is wound around a spool 52 assembled in a relay body 51, and a yoke 54 having a substantial U-shape in section is assembled in the third relay 50. The coil 53 is connected to a coil terminal 55 through a junction terminal 52a (FIG. 3) assembled in the spool 52, and the coil terminal 55 is projected toward the opening of the case 10. L-shaped rib terminals 56 and 57 that can be fitted in the notch parts 13 of the case 10 are attached to terminal parts 51a (FIG. 3) of the relay body 51. An insulating rib 51b is projected between the terminal parts 51a and 51a of the relay body 51 in order to enhance the insulating characteristic. A lower end surface of the relay body 51, the lower end surface of the spool 52, and a lower end surface of the yoke 54 are formed so as to be flush with one another, so that the third relay 50 can be accommodated in the case 10 without rattle.

The wiring board 60 has a planar shape that can be fitted in the opening of the case 10, and the wiring board 60 includes terminal holes 61 while guide projected threads 60a are projected from the upper surface of the wiring board 60. The secondary-side wiring 62a that connects the battery 3 and the motor 4 and the primary-side wiring 62b that connects the coils of the first, second, and third relays 30, 40, and 50 are provided in the wiring board 60. A connecting projection piece 64 is vertically provided in the end portion of the secondary-side wiring 62a, and a connecting projection piece 63 is vertically provided in the end portion of the primary-side wiring 62b. Particularly, the primary-side wiring 62b is provided along the guide projected thread 60a, and four pin terminals 65 are downwardly led out in parallel from the primary-side wiring 62b.

The cover 70 has the planar shape that can seal the opening of the case 10, and a looped rib 71 that can be fitted in the notch parts 12 and 13 of the case 10 is formed in an outer peripheral edge portion of an inward surface. This is because a contact area with the opening edge portion of the case 10 is enlarged to enhance a seal characteristic while a desired mechanical strength is ensured.

Accordingly, the precharge resistor 20, the precharge relay 30, the second relay 40, and the third relay 50 are accommodated in the accommodation parts 15a, 15b, 15c, and 15d of the case 10, respectively. Therefore, the connection terminal 21a of the precharge resistor 20 comes into surface contact with the connecting projection piece 47a of the second relay 40. The printed wiring board 60 is assembled in the case 10, whereby the pin terminals 65 are projected into the connecting recessed part 16 while the coil terminal 31 and connection terminal 32 of the precharge relay 30 and the coil terminals 45 and 55 of the second and third relays 40 and 50 are projected from the terminal holes 61 of the wiring board 60. The coil terminal 31, the connection terminal 32, and the coil terminals 45 and 55 come into surface contact with the connecting projection pieces 63 projected from the upper surface of the wiring board 60, and the connecting projection piece 46a of the second relay 40 comes into surface contact with the connecting projection pieces 64 of the wiring board 60. Additionally the connection terminal 21b of the precharge resistor 20 comes into contact with the connecting projection pieces 64 of the wiring board 60. Then the terminal and connecting projection pieces that are in surface contact with one another are electrically connected by resistance welding or soldering. Finally the cover 70 is fitted in the opening of the case 10 to complete assembly work.

According to the first embodiment, the connection terminals 21a and 21b of the precharge resistor 20, the coil terminal 31 and connection terminal 32 of the precharge relay 30, the coil terminals 45 and 55 of the second and third relays 40 and 50, and the connecting projection pieces 46a and 47a of the second relay 40 are projected toward the opening of the case 10, so that connection work can easily be performed to obtain the high-productivity relay unit. Particularly, the connection terminal 21a of the precharge resistor 20 and the connecting projection piece of the second relay 40 are electrically connected in the surface contact state to form the secondary-side wiring 62a of the precharge circuit. The connecting projection pieces 63 and 64 are vertically provided in the wiring board 60, and the connecting projection pieces 63 and 64 are electrically connected while being in surface contact with the connection terminal 21b and the like. Therefore, advantageously the connection work is more rapidly and easily performed, and the relay unit 1 having excellent impact resistance is obtained.

In the first embodiment, the second and third relays 40 and 50 have a structure in which a movable iron core (not illustrated) slides along a shaft center to open and close the contact. The shaft centers of the second relay 40 and third relay 50 are parallel with each other, and the rib terminals 46 and 47 of the second relay 40 and the rib terminals 56 and 57 of the third relay 50 are disposed so as to be projected from the external surfaces opposed to each other in the case 10. In the case where an impact force is applied from the outside, even if a large inertia force is applied to mistakenly operate one of the relays, the remaining relay surely breaks the circuit to prevent the malfunction. Therefore, advantageously the high-safety relay unit is obtained.

Figure 5A:
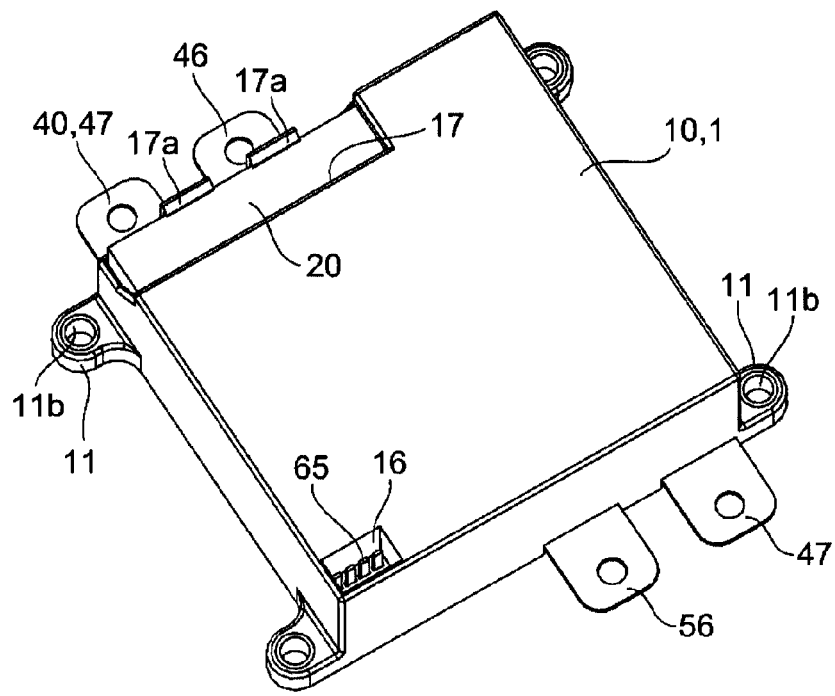
FIGS. 5A and 5B are perspective views illustrating a relay unit according to a second embodiment of the present invention.
Figure 5B:
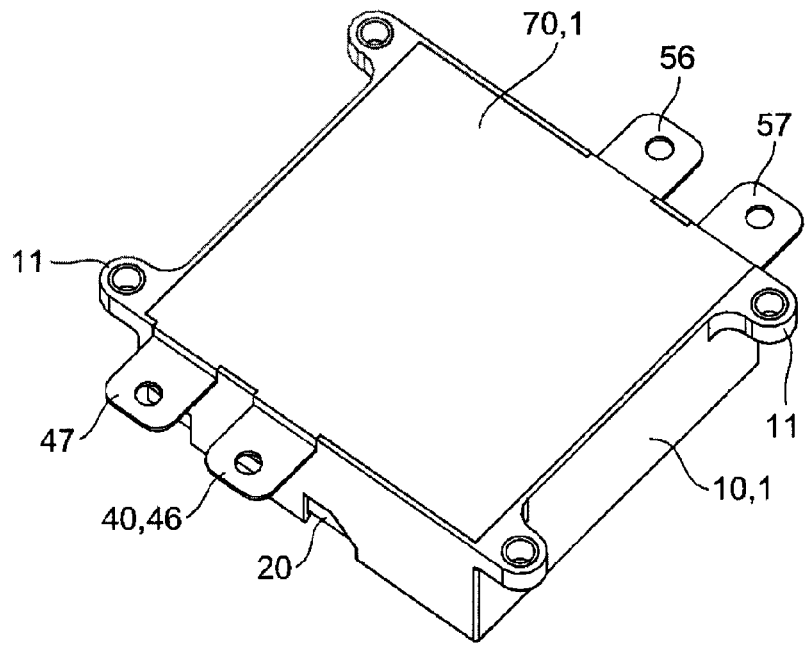
Figure 6:
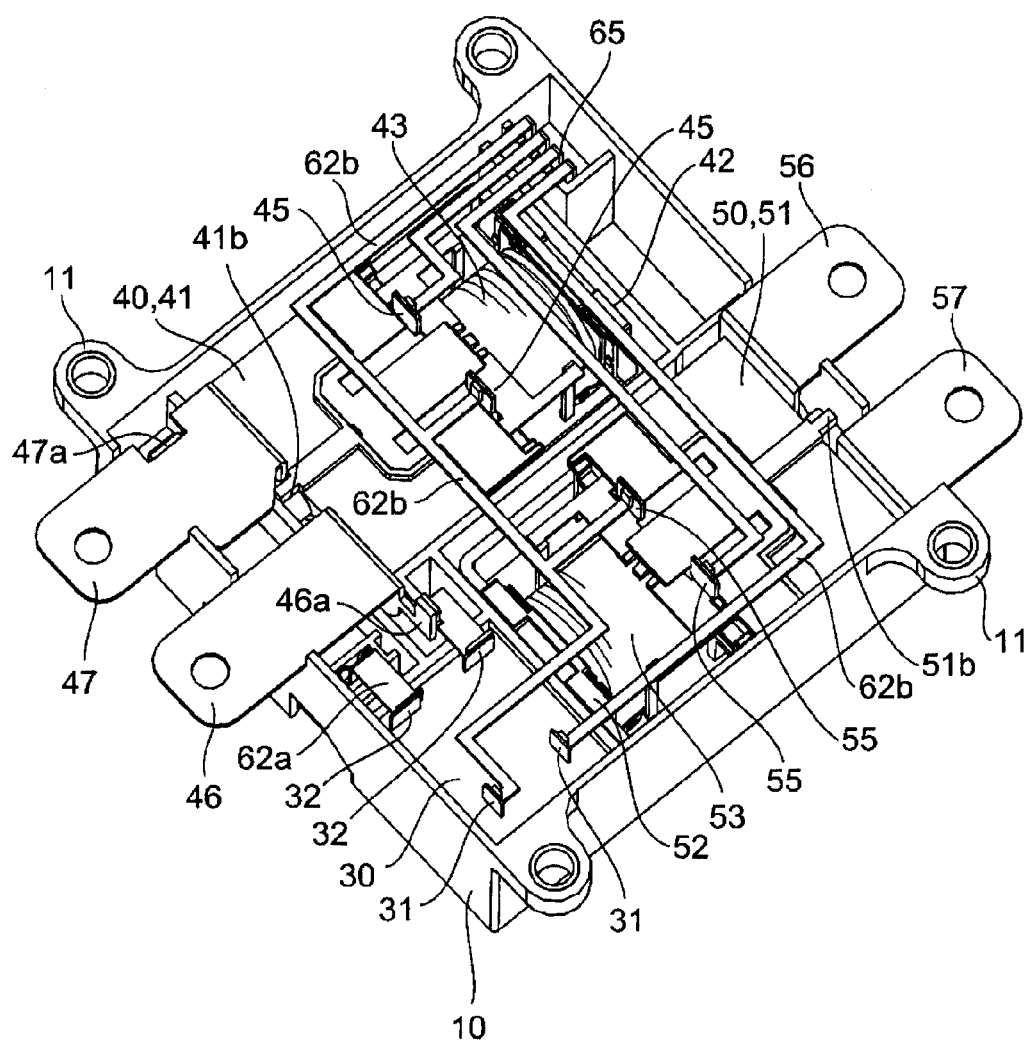
FIG. 6 is a perspective view illustrating a state in which the cover is removed from the relay unit in FIG. 5B.
Figure 7:
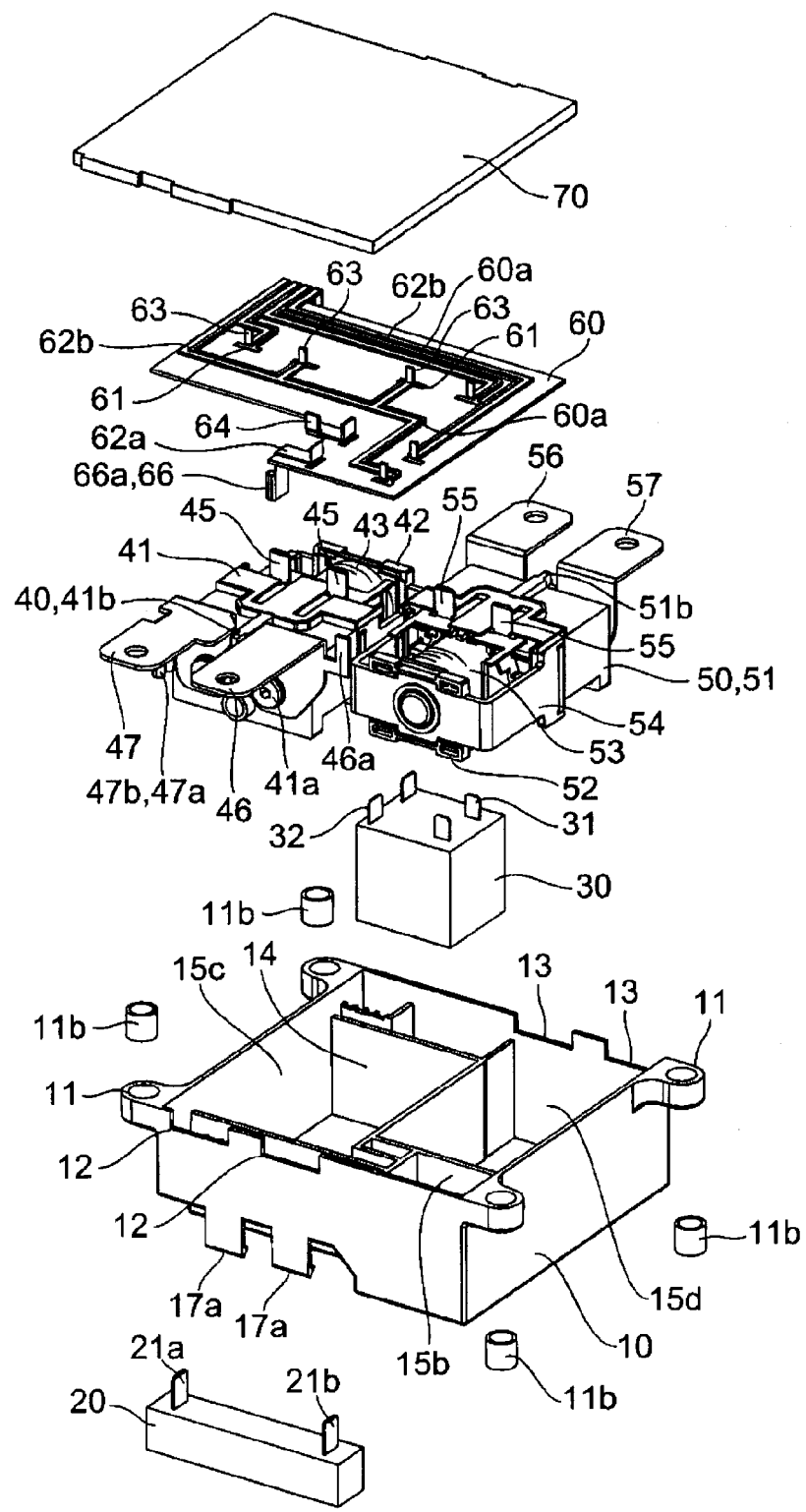
FIG. 7 is an exploded perspective view of the relay unit in FIG. 5B.
Figure 8:
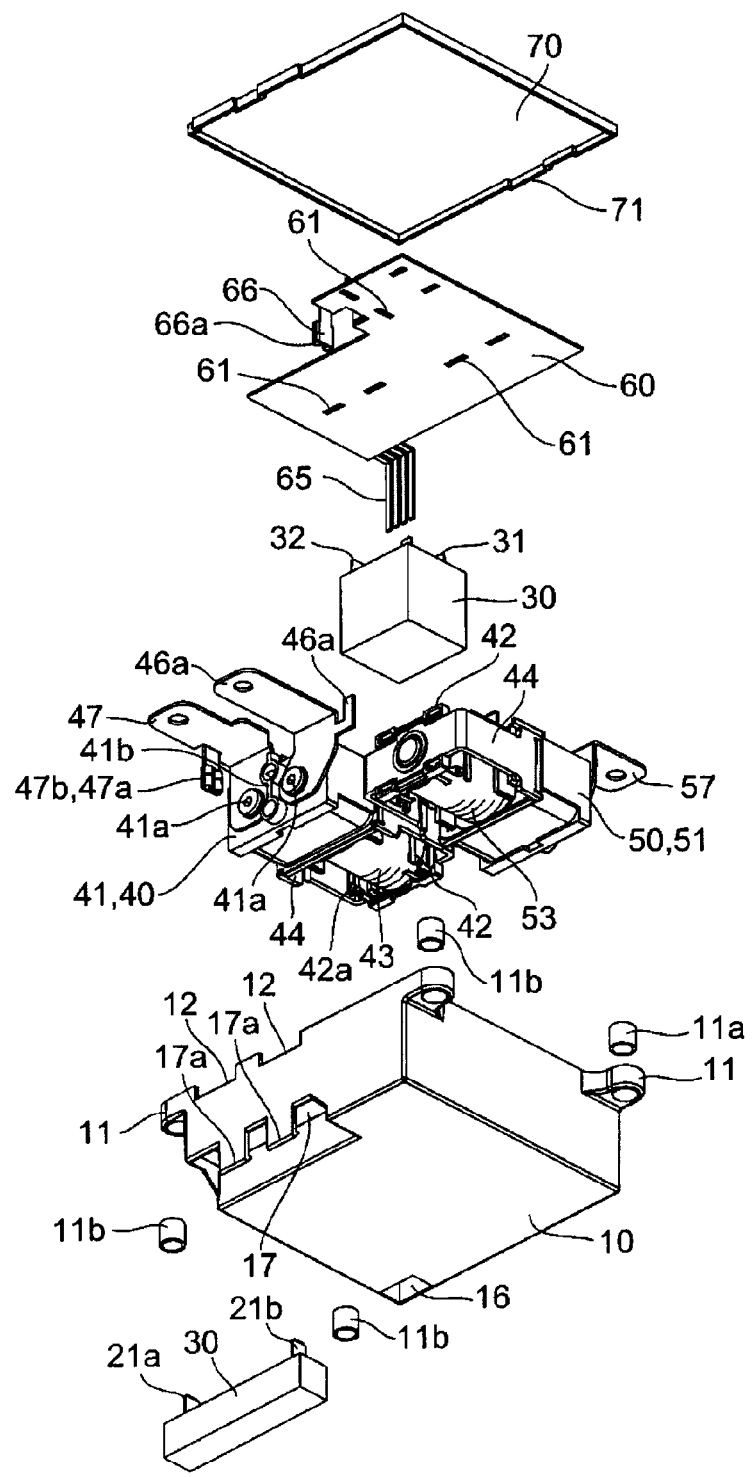
FIG. 8 is an exploded perspective view illustrating the relay unit in FIG. 5B from a different angle.
Figure 9A:
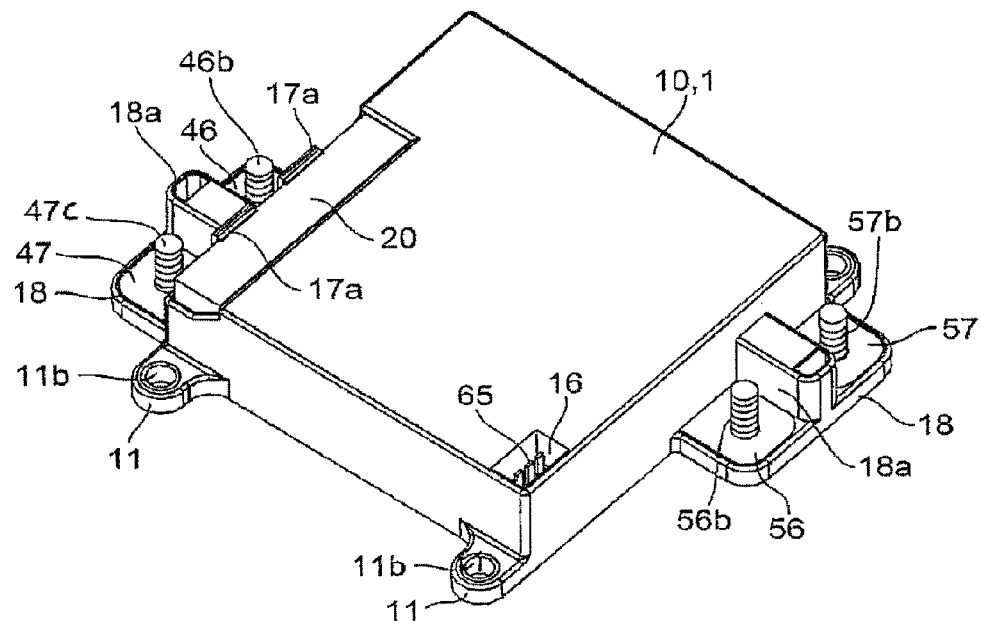
FIGS. 9A and 9B are perspective views illustrating a relay unit according to a third embodiment of the present invention.
Figure 9B:
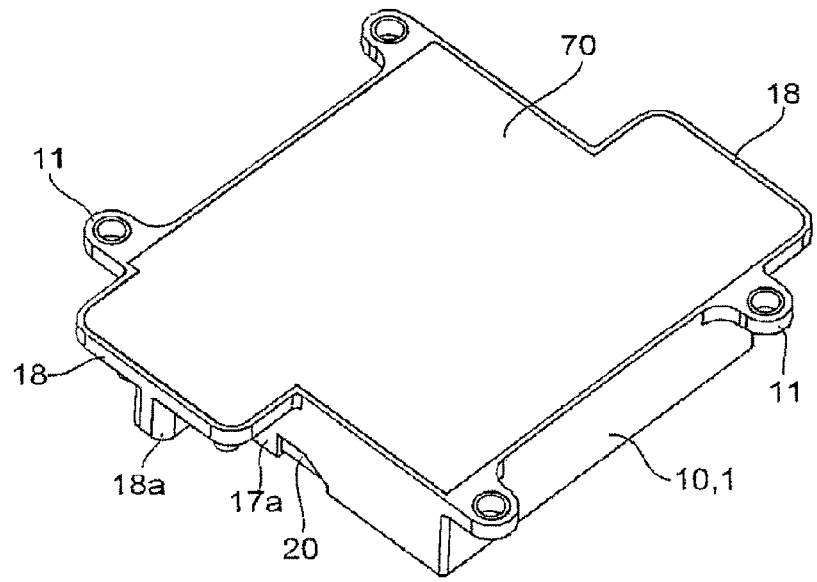
Figure 10:
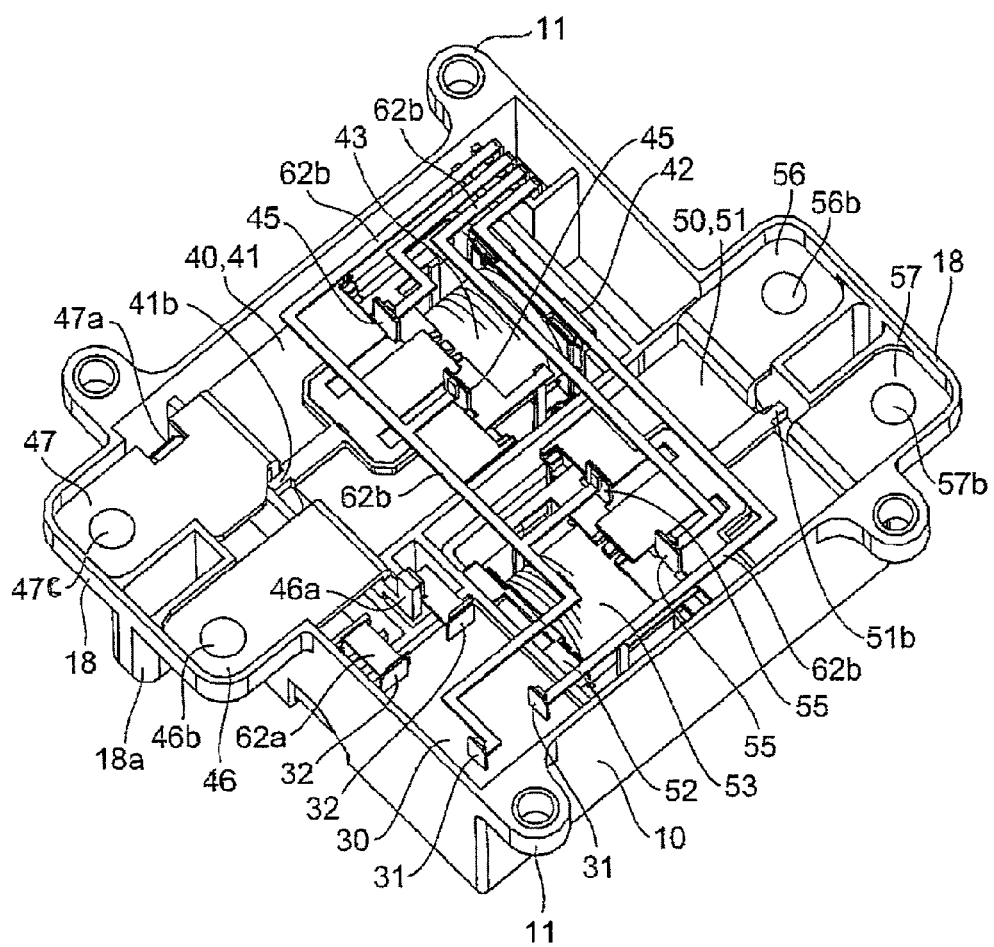
FIG. 10 is a perspective view illustrating a state in which the cover is removed from the relay unit in FIG. 9B.
Figure 11:
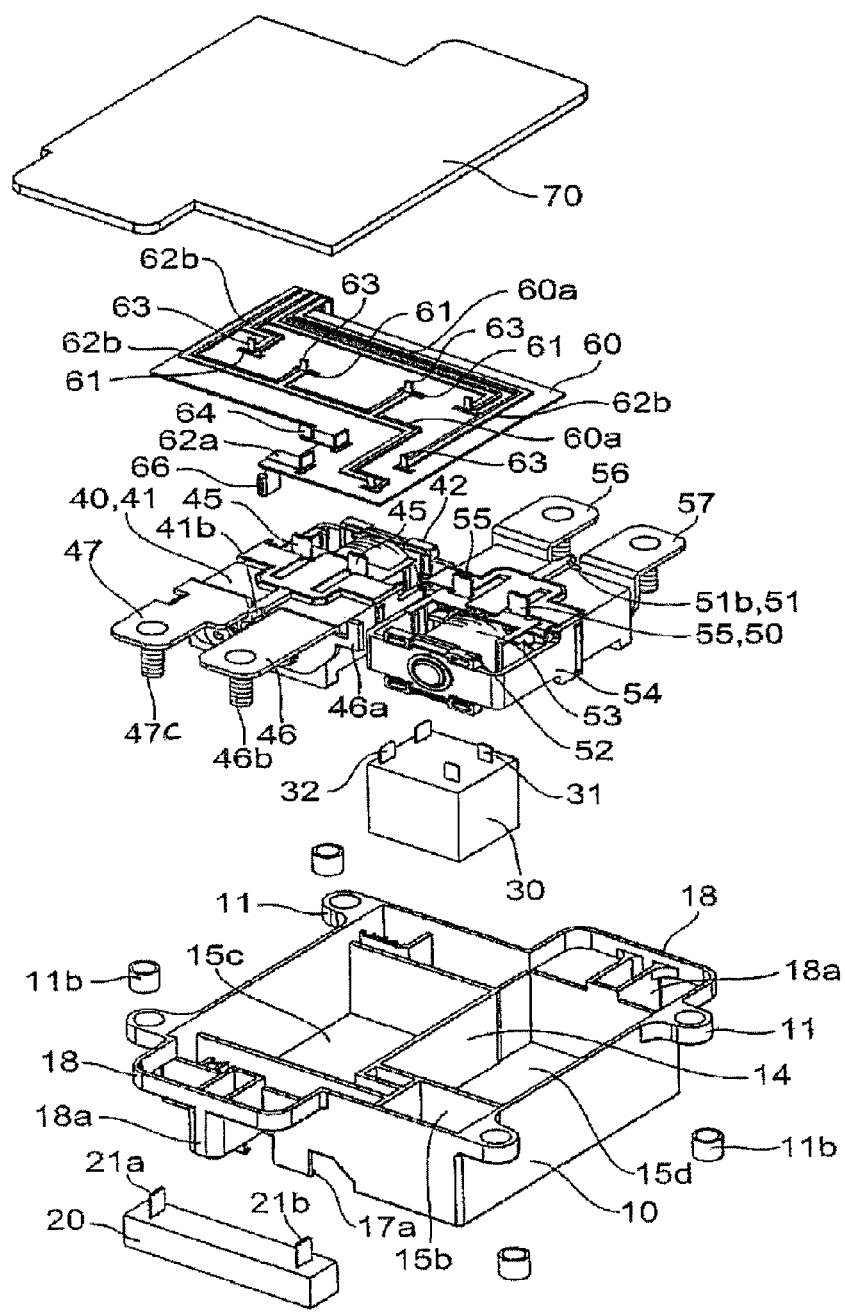
FIG. 11 is an exploded perspective view of the relay unit in FIG. 9B.
Figure 12:
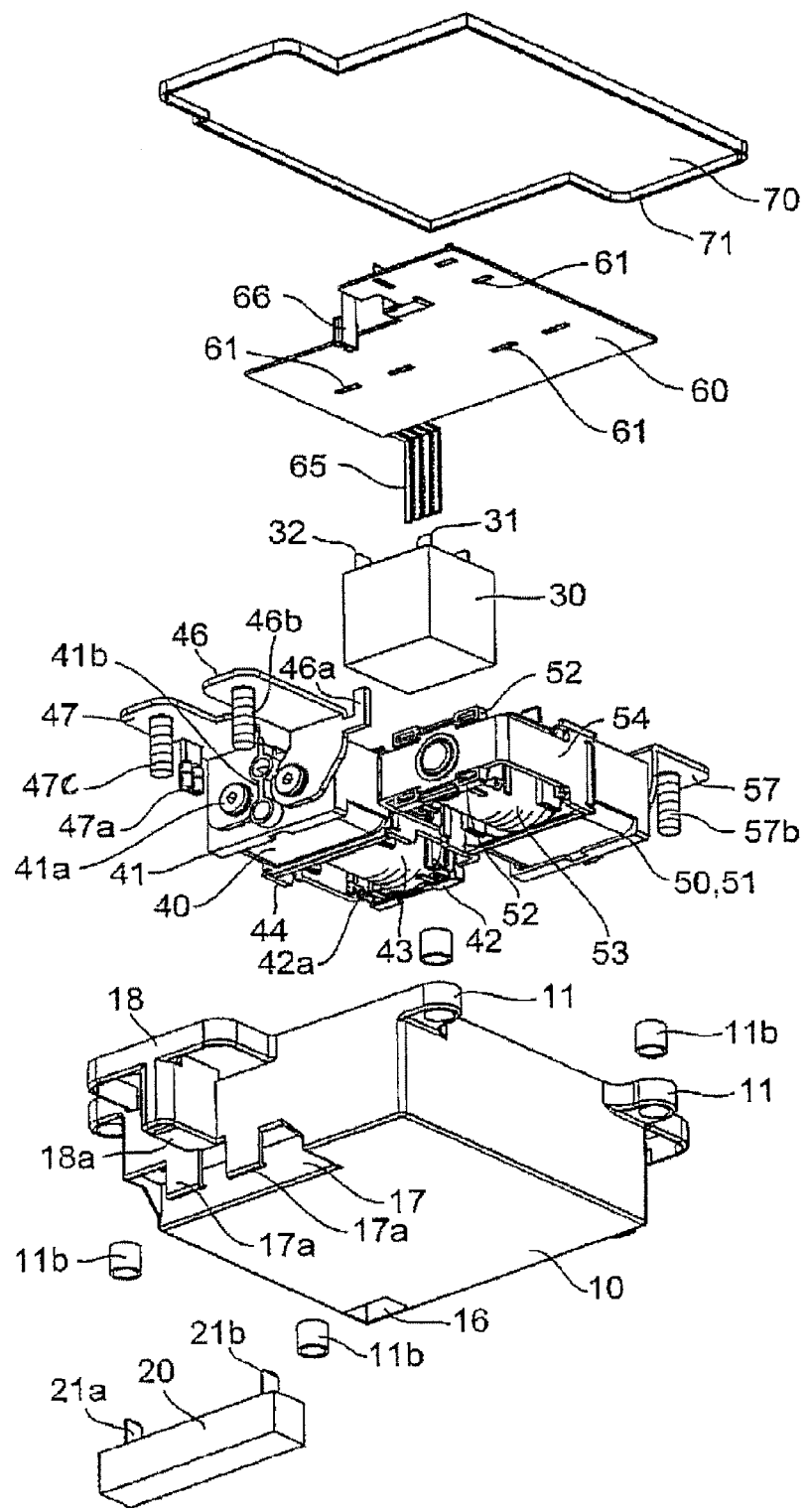
FIG. 12 is an exploded perspective view illustrating the relay unit in FIG. 9B from a different angle.
Figure 13A:
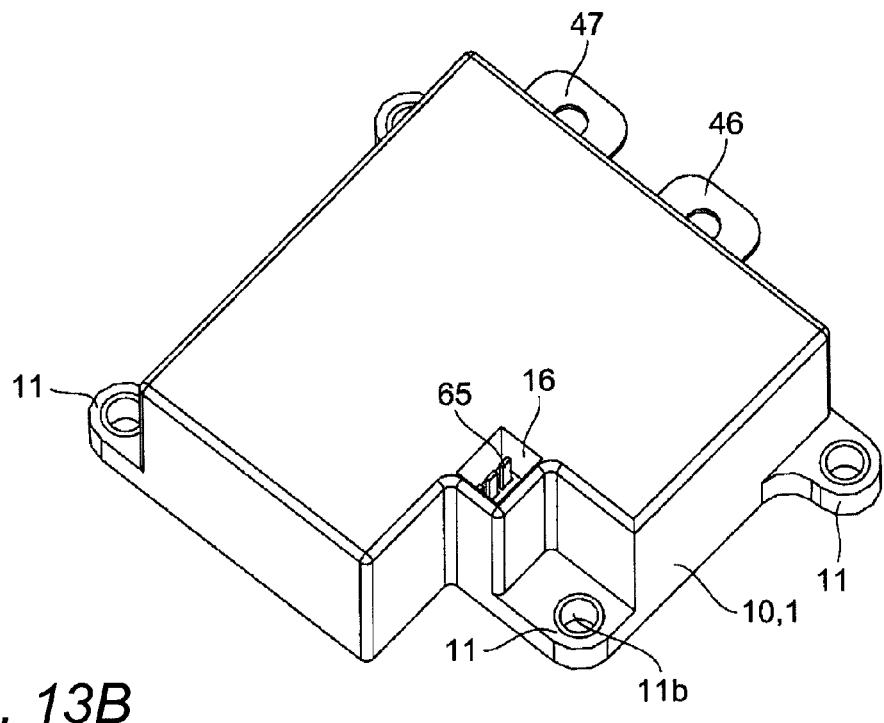
FIGS. 13A and 13B are perspective views illustrating a relay unit according to a fourth embodiment of the present invention.
Figure 13B:
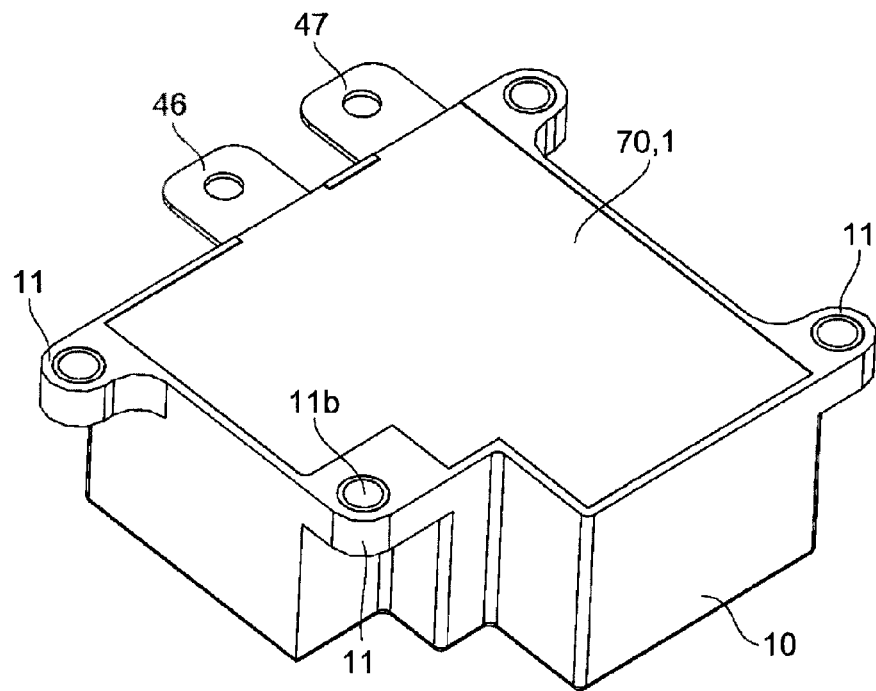
Figure 14:
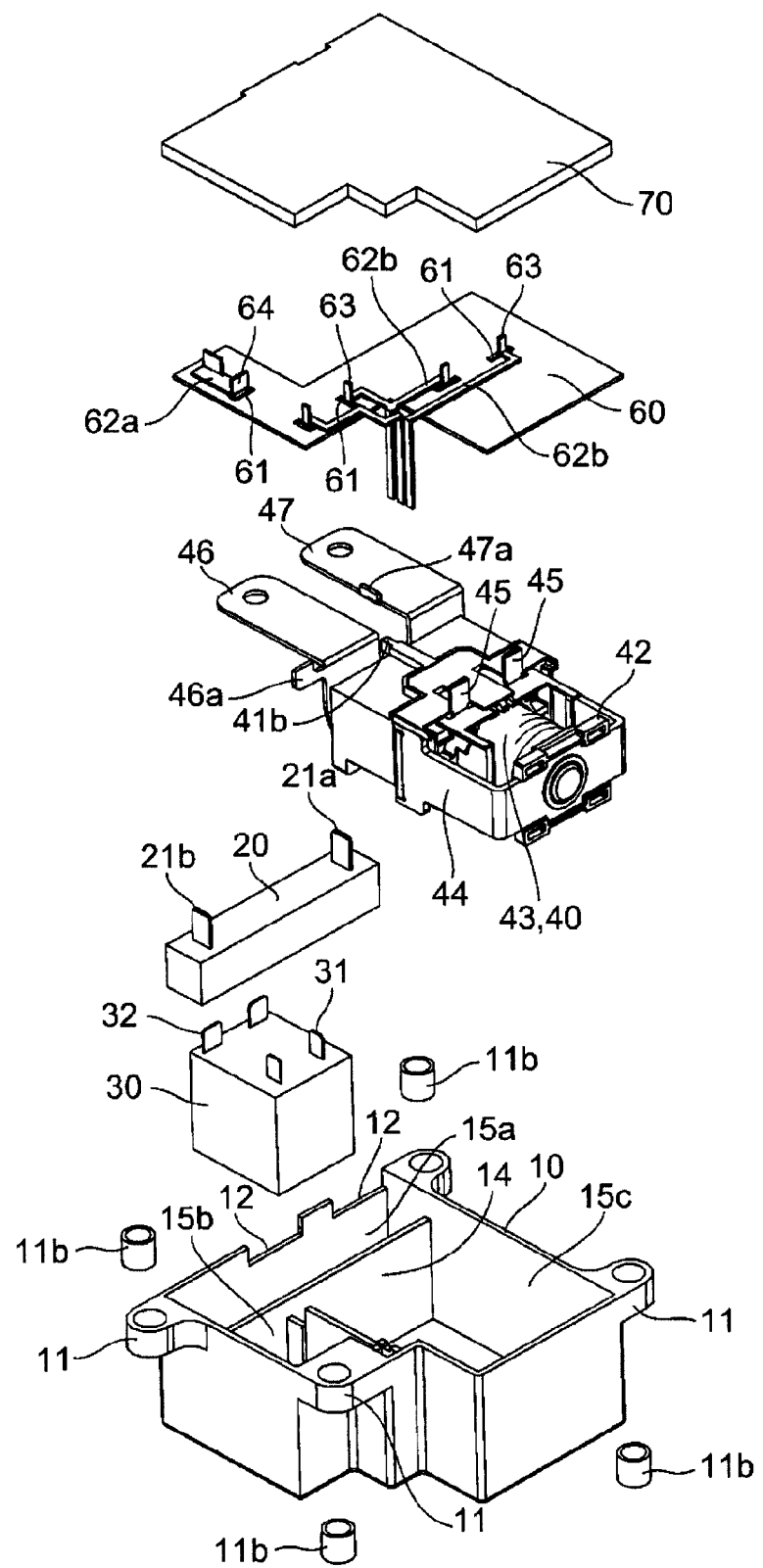
FIG. 14 is an exploded perspective view of the relay unit in FIG. 13B.
Figure 15:
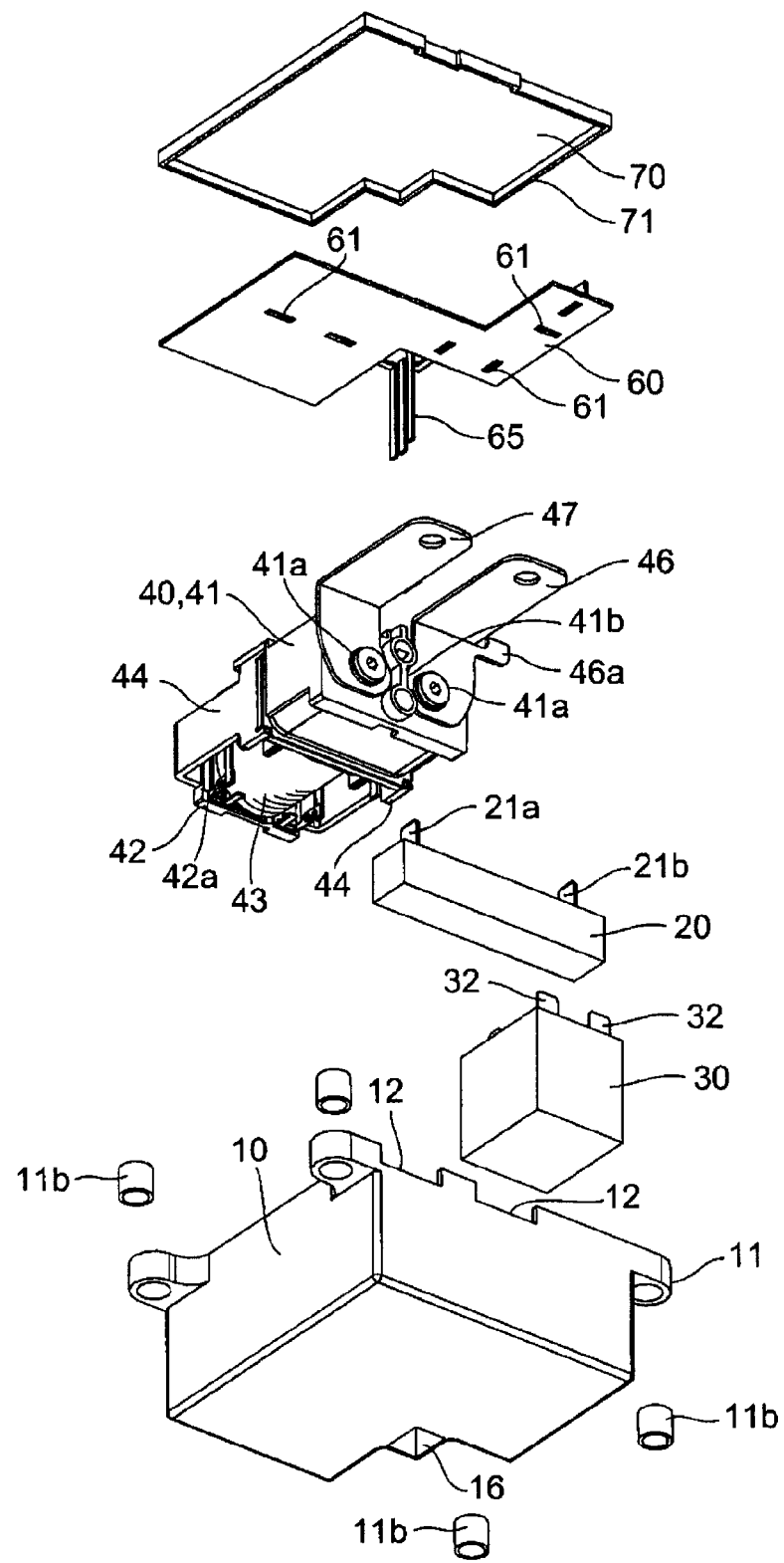
FIG. 15 is an exploded perspective view illustrating the relay unit in FIG. 13B from a different angle.
Figure 16A:
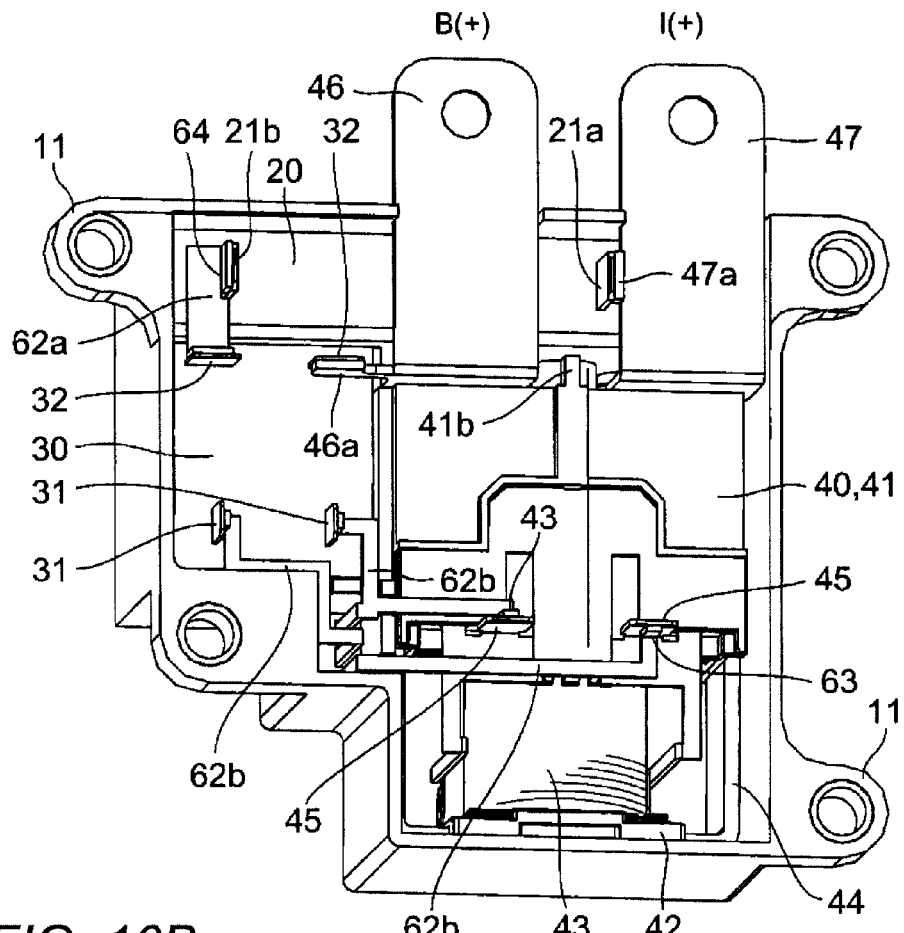
FIGS. 16A and 16B are a perspective view and a circuit diagram illustrating a state in which the cover is removed from the relay unit in FIG. 13B.
Figure 16B:
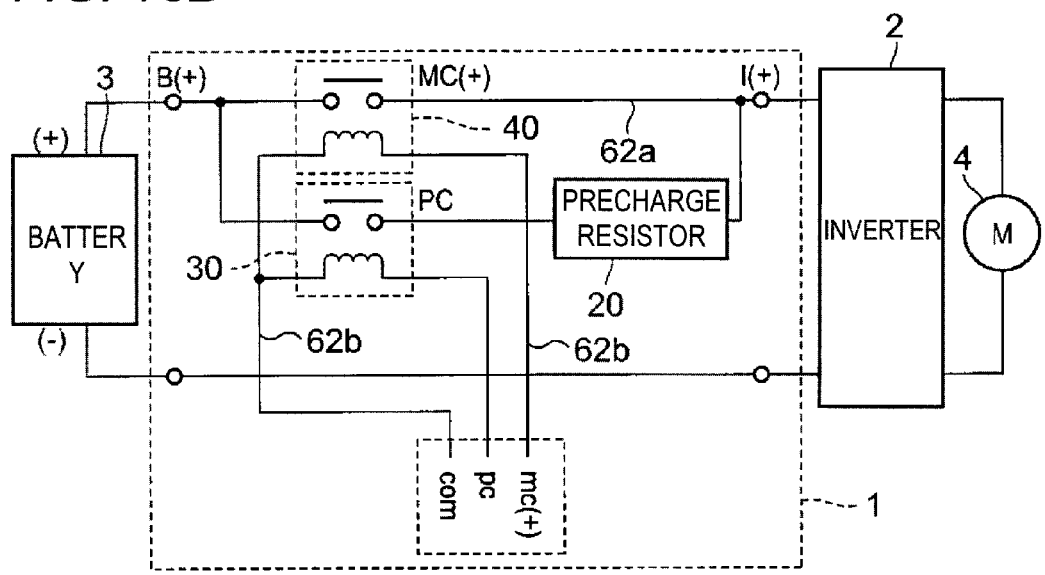
Figure 17A:
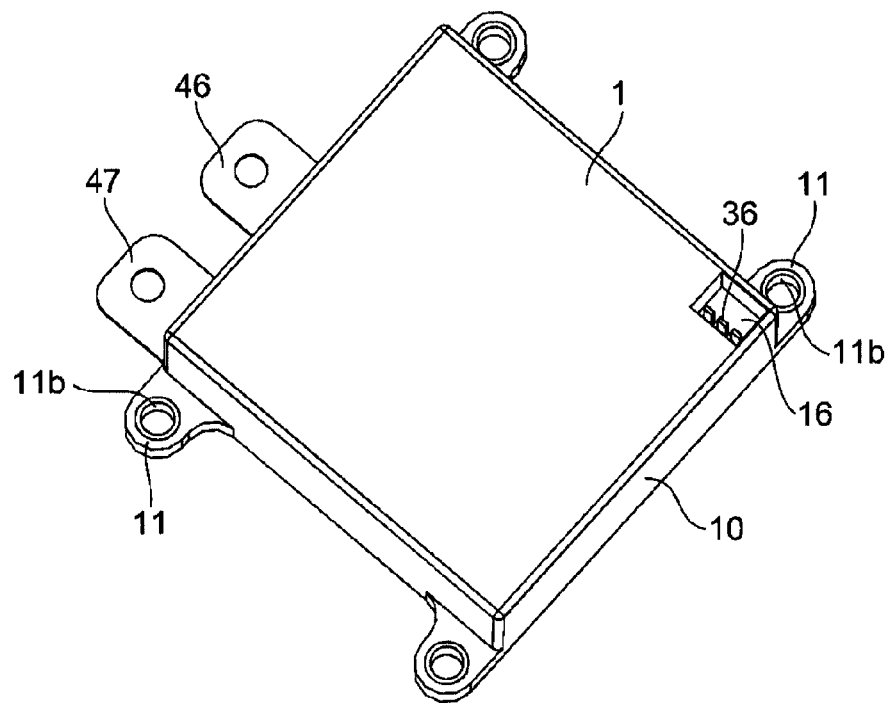
FIGS. 17A and 17B are perspective views illustrating a relay unit according to a fifth embodiment of the present invention.
Figure 17B:
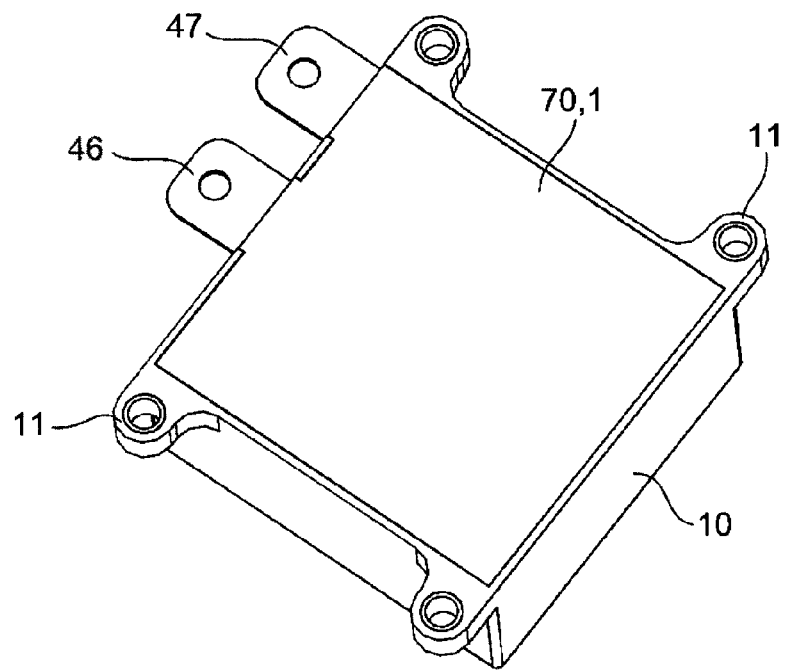
Figure 18:
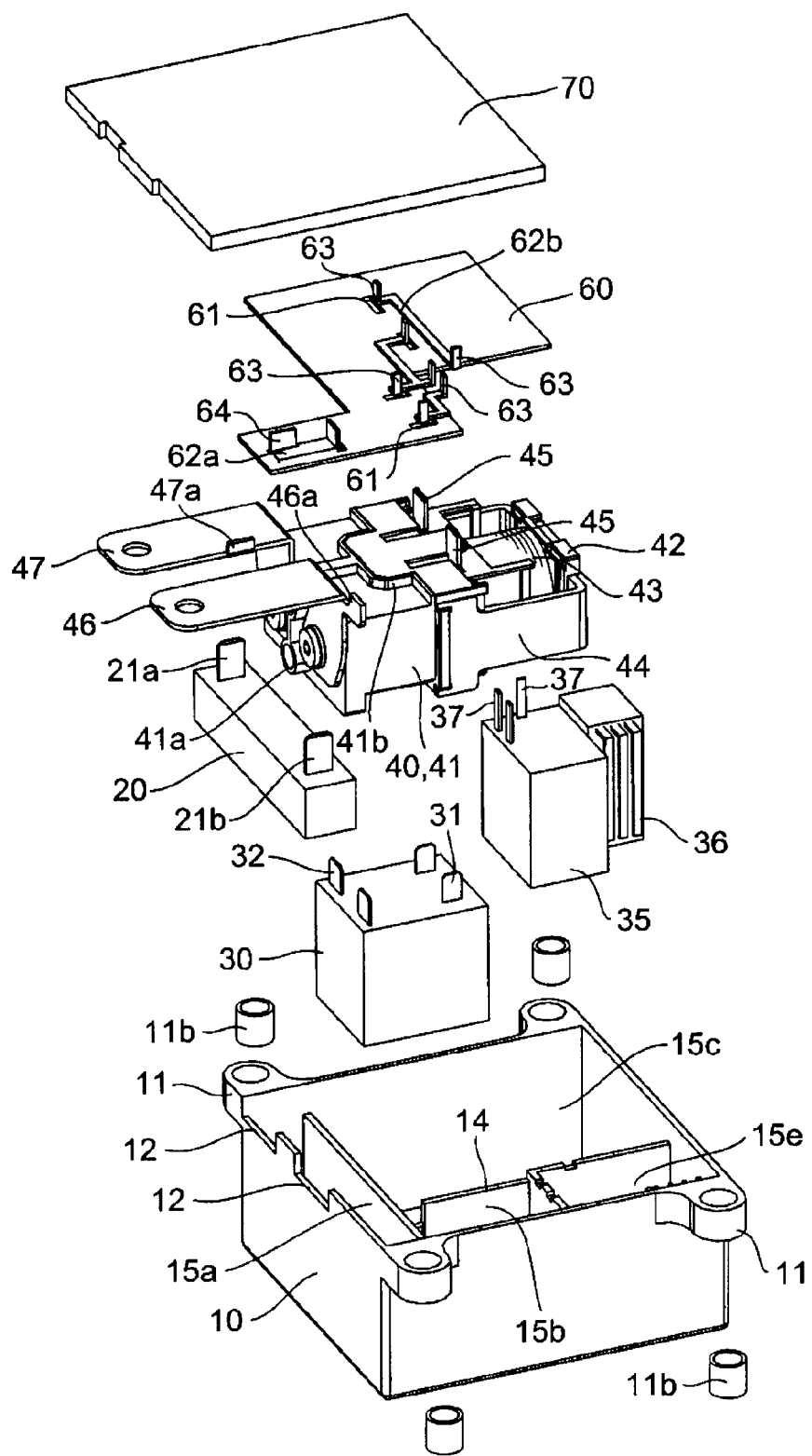
FIG. 18 is an exploded perspective view of the relay unit in FIG. 17B.
Figure 19:
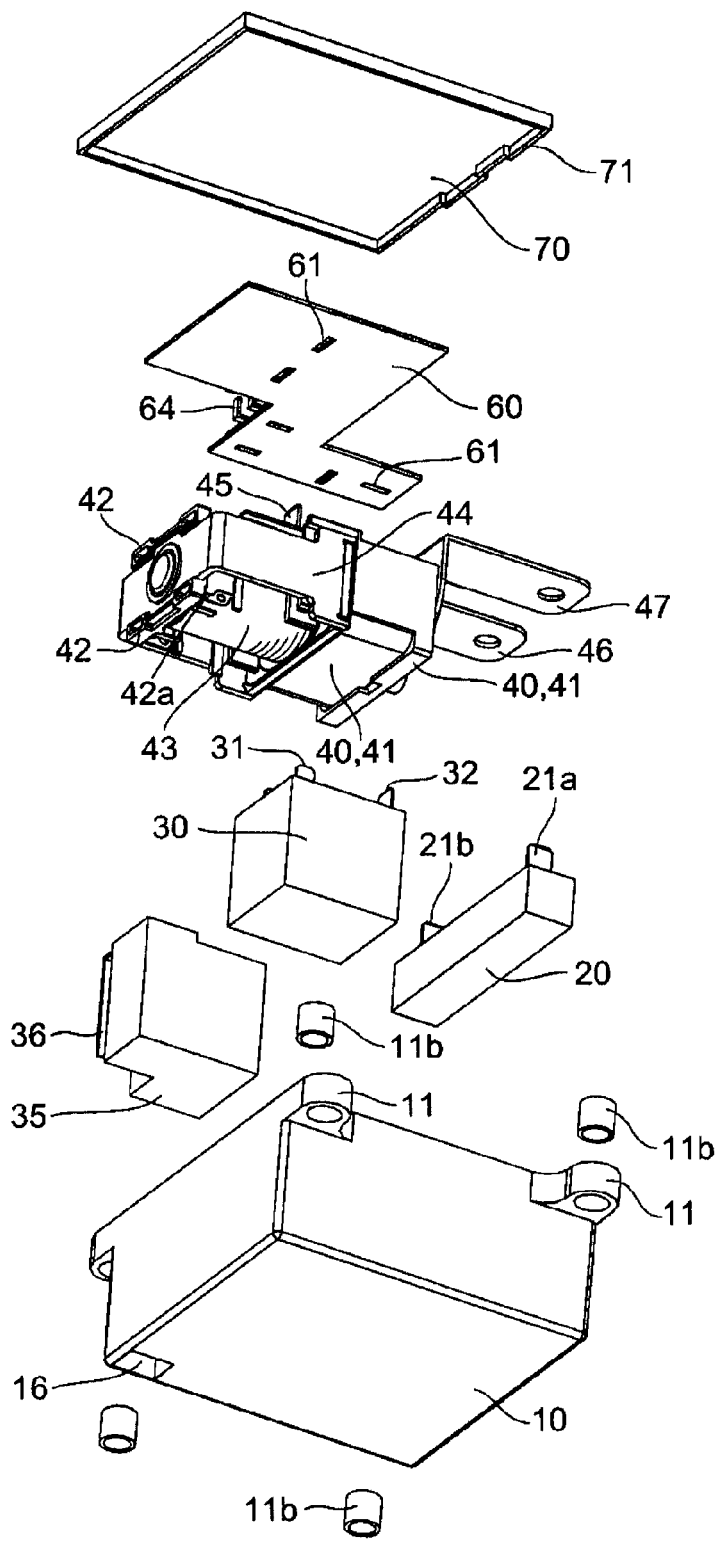
FIG. 19 is an exploded perspective view illustrating the relay unit in FIG. 17B from a different angle.
Figure 20A:
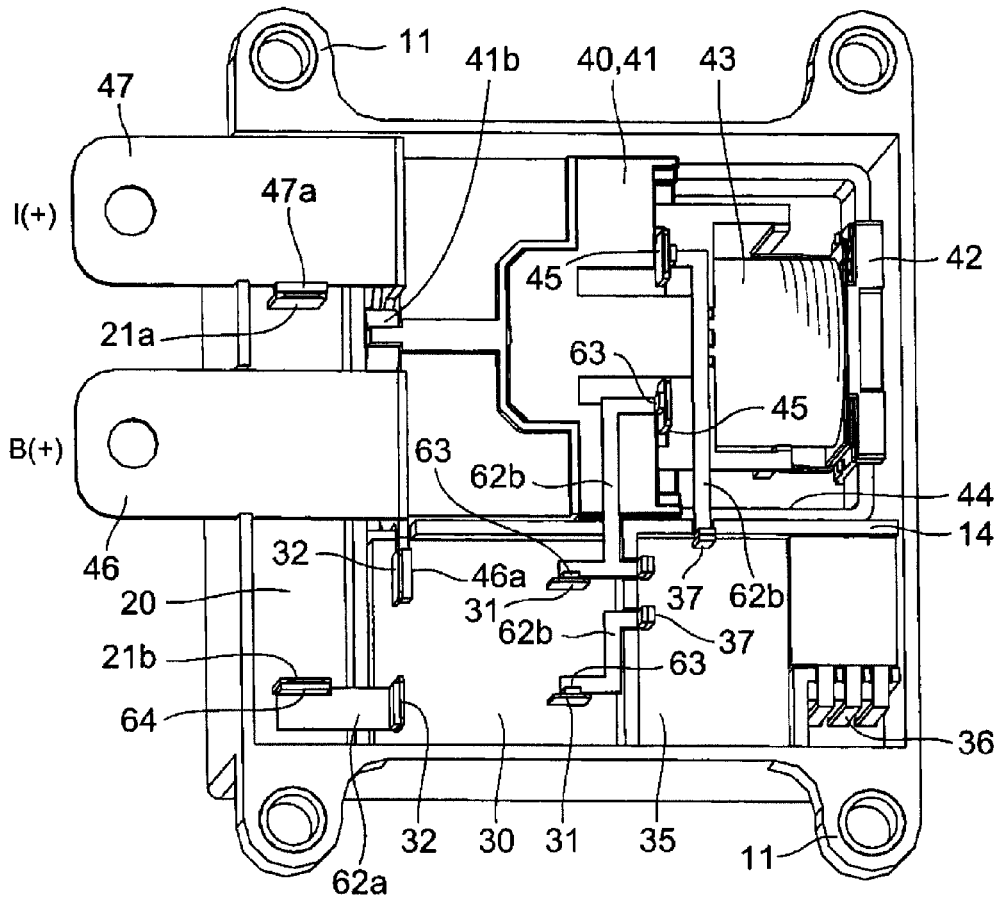
FIGS. 20A and 20B are a perspective view and a circuit diagram illustrating a state in which the cover is removed from the relay unit in FIG. 17B.
Figure 20B:
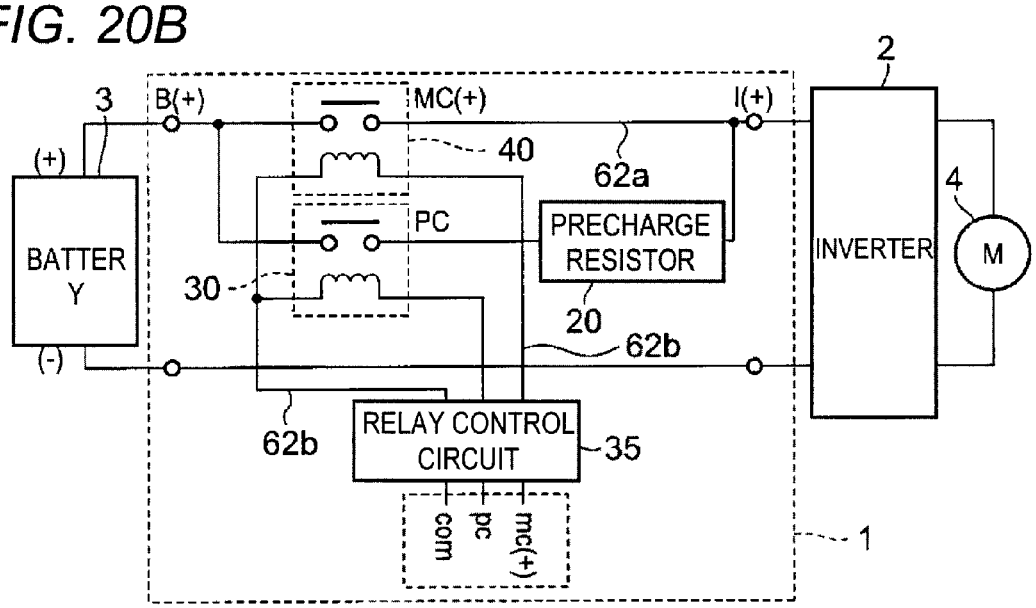

As illustrated in FIGS. 5 and 8, a relay unit according to a second embodiment is almost the same as the relay unit of the first embodiment, but differs from the relay unit of the first embodiment in that the external precharge resistor 20 is detachably attached. That is, a fitting recess 17 is provided in the edge portion on one side of the upper surface of the case 10, and retaining elastic claw parts 17a are provided. As illustrated in FIG. 6, the connecting projection piece 47a is cut and raised from the rib terminal 47 of the second relay 40 so as to be connected to the connection terminal 21a of the external precharge resistor 20. A connecting projection piece 66 extends from the secondary-side wiring 62a of the wiring board 60 so as to be connected to the connection terminal 21b of the precharge resistor 20. Elastic spring parts 47b and 66a (FIG. 8) are formed in the connecting projection pieces 47a and 66 in order to ensure a contact pressure to the connection terminal 21a and 21b respectively. In the second embodiment, because other configurations are identical to those of the first embodiment, the same component is designated by the same numeral, and the description is omitted.

According to the second embodiment, because the external precharge resistor 20 is detachably provided, maintenance is easy to perform. As needed basis, a user exchanges the precharge resistor 20 to obtain a relay unit having s different specification, and thereby advantageously facilitating inventory adjustment.

As illustrated in FIGS. 9 to 12, a relay unit according to a third embodiment is almost the same as the relay unit of the second embodiment. The relay unit of the third embodiment differs from the relay unit of the second embodiment in that the rib terminals 46, 47, 56, and 57 are electrically connected by nuts (not illustrated) and that the cover 70 is formed into a planar shape that can cover the lower surfaces of the rib terminals 46, 47, 56, and 57. That is, frame parts 18 and 18 in which the rib terminals 46 and 47 and the rib terminals 56 and 57 can be fitted extend from the opening edge portion of the case 10, and an insulating wall 18a is integrally molded in the frame part 18. External threads 46b, 47c, 56b, and 57b are provided in the rib terminals 46, 47, 56, and 57, respectively to allow electrical connection by nuts. In the third embodiment, because other configurations are identical to those of the second embodiment, the same component is designated by the same numeral, and the description is omitted.

According to the third embodiment, because the relay unit can be connected to the external circuit through the external threads 46b, 47c, 56b, and 57b, connection reliability is enhanced. Additionally, because the frame part 18 and the insulating wall 18a are provided, advantageously a distance along the surface between the rib terminals 46 and 47 and a distance along the surface between the rib terminals 56 and 57 are lengthened to obtain the relay unit 1 having the high insulating characteristic.

As illustrated in FIGS. 13 to 16, a relay unit according to a fourth embodiment is almost the same as from the relay unit of the first embodiment, but differs from the relay unit of the first embodiment in that the third relay 50 is not provided but the shapes of the case 10 and cover 70 are changed. In the fourth embodiment, because other configurations are identical to those of the first embodiment, the same component is designated by the same numeral, and the description is omitted.

According to the fourth embodiment, because the third relay 50 is not provided, the relay unit 1 having the small number of components and the small number of man-hours is advantageously obtained.

As illustrated in FIGS. 17 to 20, in a relay unit according to a fifth embodiment, the precharge resistor 20, the precharge relay 30, the second relay 40, and a relay control circuit block 35 are accommodated in accommodation parts 15a, 15b, 15c, and 15e into which the case 10 is partitioned by the partition wall 14, respectively, and these electronic components are electrically connected to one another through the wiring board 60. As illustrated in FIG. 20B, the electric connection is performed such that the precharge relay 30 that is of the first relay and the second relay 40 are controlled. Particularly, a pin terminal 36 extending from the side surface of the relay control circuit block 35 is projected so as to be able to be connected to the connecting recessed part 16 of the case 10. The connection terminals 37 projected toward the opening of the case 10 from the upper surface of the relay control circuit block 35 are bonded to the connecting projection pieces 63 vertically provided in the wiring board 60 while being in surface contact with the connecting projection pieces 63, respectively. In the fifth embodiment, because other configurations are identical to those of the first to fourth embodiments, the same component is designated by the same numeral, and the description is omitted.

According to the fifth embodiment, because the relay control circuit block 35 is also incorporated, the relay unit in which the work to electrically connect the external circuit is further simplified is advantageously obtained.

In the embodiments, each electronic component is connected through the wiring board by way of example. Alternatively, as needed basis, each electronic component may be connected using a lead, or each electronic component may be connected using both the printed wiring and the lead. The wiring board is not limited to the printed wiring, but the connection may be performed through a linear conductive member fixed to an insulating board.

The present invention can be applied not only to the in-vehicle relay unit but also to a relay unit for a household power supply.

There has thus been shown and described a relay unit and producing method thereof which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A relay unit that electrically opens and closes between a power supply and a power-consuming device, the relay unit comprising:
    electronic components disposed in a housing including a case and a cover, the electronic components including a resistor with first and second resistor connection terminals, a first relay connected in series with the resistor, the first relay having a first relay driving coil terminal and first and second relay connection terminals, and a second relay, the second relay having first and second external connection terminals, the second relay connecting the power supply and the power-consuming device through an external connection terminal of the second relay and being connected in parallel with the resistor and the first relay;
    a wiring board separately disposed in the housing from the resistor, the first relay and the second relay, the wiring board being configured to hold wiring disposed on a surface of the wiring board for connecting up the resistor, the first relay and the second relay when the wiring board is disposed in the housing, the wiring comprising:
        a first connecting projection piece extending vertically from the wiring board, the first connecting projection piece being insulated from the first relay driving coil terminal of the first relay, the first connecting projection piece being arranged for contacting the first relay connection terminal, the first connecting projection piece being part of the wiring leading to a point for contacting the first connection terminal of the resistor so as to electrically connect the first connection terminal of the resistor with the first relay connection terminal; and
        a second connecting projection piece extending vertically from the wiring board, the second connecting projection piece being arranged for contacting the second connection terminal of the first relay, the second connecting projection piece being part of the wiring leading to a point for contacting the first external connection terminal of the second relay so as to electrically connect the second connection terminal of the first relay with the first external connection terminal of the second relay;
        wherein the second connection terminal of the resistor and the second external connection terminal of the second relay are directly electrically connected to each other.

2. The relay unit according to claim 1, wherein the first and second connection terminals of the resistor and first and second relay connection terminals of the first relay are projected toward an opening of the case.

3. The relay unit according to claim 2, wherein the second relay is accommodated in the housing such that a winding shaft center of a coil is disposed along the opening of the case.

4. The relay unit according to claim 2, wherein the second connecting projection piece is projected toward the opening of the case, the second connecting projection piece being projected from the external connection terminal of the second relay.

5. The relay unit according to claim 3, wherein electronic components are disposed in the housing, the electronic components including the resistor, the first relay, the second relay, and a third relay, the third relay electrically connecting the power supply and the power-consuming device through an external connection terminal of the third relay.

6. The relay unit according to claim 5, wherein the second relay and the third relay are disposed in the housing such that the winding shaft centers of the coils of the second and third relays are provided along the opening of the case and in parallel with each other.

7. The relay unit according to claim 5, wherein the external connection terminals of the second and third relays are laterally projected from outside surfaces opposed to each other in the case.

8. The relay unit according to claim 5, wherein an insulating wall is provided between the external connection terminals of the second and third relays.

9. The relay unit according to claim 1, wherein an insulating wall is provided between the external connection terminals of the second relay.

10. The relay unit according to claim 1, wherein each of the electronic components is disposed in corresponding accommodation parts partitioned by an insulating wall provided in the case.

11. The relay unit according to claim 1, wherein the relay unit comprises a control circuit block for controlling the relays disposed in the housing.

12. The relay unit according to claim 1, wherein the resistor is removably disposed in a recess, the recess being provided in an outer surface of the case.

13. The relay unit according to claim 1, wherein the first relay coil terminal is projected toward the opening of the case, and the first relay coil terminal is electrically connected through the wiring board.

14. The relay unit according to claim 13, wherein a guide projected thread is projected on the wiring board in order to guide a wiring electrically connecting the coil terminal.

15. A method for connecting a relay unit comprising:
    connecting connection terminals of a resistor and a connection terminal of a first relay to each other through a first connecting projection piece extending vertically from a wiring board, the first connecting projection piece being insulated from a relay driving coil terminal of the first relay;
    connecting a second connection terminal of the first relay and an external connection terminal of a second relay to each other through a second connecting projection piece extending vertically from the wiring board, the second connecting projection piece being insulated from the relay driving coil terminal of the first relay; and
    electrically connecting a second connection terminal of the resistor and a second external connection terminal of the second relay directly to each other,
    the resistor, the first relay and the second relay being disposed in a housing, the wiring board being separately disposed in the housing from the resistor, the first relay and the second relay, the wiring board being configured to hold wiring disposed on a surface of the wiring board for connecting up the resistor, the first relay and the second relay when the wiring board is disposed in the housing, the wiring comprising:
        the first connecting projection piece being arranged for contacting the first relay connection terminal, the first connecting projection piece being part of the wiring leading to a point for contacting the first connection terminal of the resistor so as to electrically connect the first connection terminal of the resistor with the first relay connection terminal; and
        the second connecting projection piece being arranged for contacting the second connection terminal of the first relay, the second connecting projection piece being part of the wiring leading to a point for contacting the first external connection terminal of the second relay so as to electrically connect the second connection terminal of the first relay with the first external connection terminal of the second relay.

16. The method according to claim 15 comprising:
electrically connecting a coil terminal projected towards an opening of a case of the housing from an electronic component through a wiring board, after installing each electronic component of the relay unit from the opening of the case.

17. The method according to claim 16 comprising:
projecting a guide projected thread on the wiring board in order to guide a wiring electrically connecting the coil terminal.

18. The method according to claim 16 comprising:
providing a control circuit block for controlling the first or second relay.

19. A relay unit that electrically opens and closes between a power supply and a power-consuming device, the relay unit comprising:
a housing including a case and a cover;
a resistor disposed in the housing;
a first relay connected in series with the resistor;
a second relay connected in parallel with the resistor and the first relay and connecting the power supply and the power-consuming device through an external connection terminal of the second relay;
a wiring board being separately disposed in the housing from the resistor, the first relay and the second relay, the wiring board including a first surface adjacent the first and second relays and a second surface adjacent the cover, the wiring board being configured to hold wiring disposed on the second surface of the wiring board for connecting up the resistor, the first relay and the second relay when the wiring board is disposed in the housing, the wiring comprising:
secondary-side wiring including a first connecting projection piece and a second connecting projection piece extending from the second surface of the wiring board, the secondary-side wiring being insulated from a relay driving coil terminal of the relay,
the first connecting projection piece being arranged for contacting a connection terminal of the first relay, the first connecting projection piece being part of the wiring leading to a point for contacting a connection terminal of the resistor so as to electrically connect the connection terminal of the resistor with the connection terminal of first relay, and
the second connecting projection piece being arranged for contacting a second connection terminal of the first relay, the second connecting projection piece being part of the wiring leading to a point for contacting an external connection terminal of the second relay so as to electrically connect the second connection terminal of the first relay with the external connection terminal of the second relay;
wherein a second connection terminal of the resistor and a second external connection terminal of the second relay are directly electrically connected to each other.

* * * * *